United States Patent

Nier

[15] 3,689,985

[45] Sept. 12, 1972

[54] METHOD OF MAKING A SEMICONDUCTOR UNIT

[72] Inventor: Johannes Nier, Stuttgart, Germany

[73] Assignee: Robert Bosch GmbH, Stuttgart, Germany

[22] Filed: July 15, 1971

[21] Appl. No.: 162,965

Related U.S. Application Data

[62] Division of Ser. No. 16,303, March 4, 1970, abandoned.

[30] Foreign Application Priority Data

March 8, 1969 Germany..........P 19 11 915.4

[52] U.S. Cl. ....................29/471.3, 29/464, 29/466, 29/471.1, 29/493, 29/589, 269/40

[51] Int. Cl. ..........................................B23k 31/02

[58] Field of Search.......29/471.1, 471.3, 472.1, 493, 29/464, 466, 589; 269/40, 47

[56] References Cited

UNITED STATES PATENTS

| | | | |
|---|---|---|---|
| 3,153,275 | 10/1964 | Ackerman | 29/493 X |
| 3,204,327 | 9/1965 | Da Costa | 29/493 X |
| 3,390,450 | 7/1968 | Checki et al. | 29/464 X |
| 3,568,295 | 3/1971 | Moran | 29/471.1 X |
| 3,611,555 | 10/1971 | Jo Nier | 29/591 |

*Primary Examiner*—John F. Campbell
*Assistant Examiner*—Richard Bernard Lazarus
*Attorney*—Michael S. Striker

[57] ABSTRACT

A method of making a semiconductor element. A first semiconductor body has a pair of first major surfaces on opposite sides. A first contact is provided on and covers one of the first surfaces. A socket plate is conductively connected to the other of the first surfaces and has a first contact pin. A second semiconductor body has a pair of second major surfaces and a second contact provided on and covering one of these second major surfaces. A carrier is connected with the socket plate and the second semiconductor body and located between the two. A second contact pin is provided on the second body at a side thereof facing away from the carrier and a third contact pin is provided, both the second and third contact pins penetrating the socket in insulated relationship. A connecting wire has a straight first end portion conductively secured to the second contact pin, a helically convoluted second portion conductively secured to the third contact pin, and a center portion with respect to which each of the end portions extends at an angle. An additional contact pin is provided on the first semiconductor body at a side thereof facing away from the socket plate and is in direct electrically conductive engagement with the carrier.

7 Claims, 16 Drawing Figures

INVENTOR
Johannes NIER
BY his ATTORNEY

INVENTOR
Johannes NIER
BY

[signature]
his ATTORNEY

INVENTOR
Johannes NIER
BY
[signature]
his ATTORNEY

INVENTOR
Johannes NIER
BY his ATTORNEY

METHOD OF MAKING A SEMICONDUCTOR UNIT

CROSS-REFERENCE TO RELATED APPLICATIONS

Related applications were filed in 1970 in the name of Johannes Nier; they are copending under Ser. No. 3,388 filed on Jan. 16, 1970 now U.S. Pat. No. 3,611,555 under the title "Method of Assembling a Semiconductor Device," and Ser. No. 16,303, filed Mar. 4, 1970 which latter this is a division and now abandoned.

BACKGROUND OF THE INVENTION

The present invention relates generally to semiconductors, and more particularly to semiconductor units. Still more specifically the present invention relates to a method of making a novel semiconductor unit.

In one of the aforementioned related applications a semiconductor element or unit has been disclosed having a semiconductor body an entire major surface of which is covered with a first contact. The other major surface is connected by soldering to a socket plate which carries a first contact pin, and a second semiconductor body is again provided with a contact covering an entire major surface thereof and being conductively connected by soldering to a carrier which is arranged upwardly above the socket plate. The carrier is provided with an opening into which extends a second contact pin which passes through the socket plate in insulated relationship. The semiconductor body which is connected by soldering to the carrier is provided on its surface facing away from the carrier with an additional contact which is connected by means of a wire with a further or third contact pin passing in insulated relationship through the socket plate. The wire has a first end portion which is straight and extends at an angle to a center portion of the wire and which is soldered to the contact of the semiconductor body which is conductively connected with the carrier; a further end portion of the wire, also angled with respect to the center portion thereof, is helically convoluted and slipped over the third contact pin and soldered thereto. Finally, the semiconductor body which is soldered to the socket plate is provided on its surface facing away from the socket plate with an additional contact which is electrically conductively connected with the carrier.

This semiconductor element, proposed in the aforementioned related copending applications, has certain advantages over the prior art which are developed in detail in the copending applications. It is pointed out that in that construction the electrically conductive connection between the carrier and thus the semiconductor body soldered onto the socket plate, or more specifically the second contact of this semiconductor body, is provided by the second contact pin which extends into the opening provided in the carrier, and by means of a further contact wire which extends from this second contact pin to the second contact of the semiconductor body which is soldered to the socket plate. This additional or second contact wire is constructed in the same manner as the above-described first-mentioned contact wire and is secured to its associated components in the same manner as the first-mentioned contact wire is connected with the components associated therewith. It has been found, however, that in the interest of still simpler manufacture of a semiconductor element, and concomitant savings in time, labor costs and material costs, further improvements are desirable.

SUMMARY OF THE INVENTION

It is, accordingly, an object of the present invention to provide such further improvements.

More particularly it is an object of the present invention to provide a method of making an improved semiconductor unit of the aforedescribed type which is less expensive to construct and therefore less expensive to sell.

In addition it is another object of the invention to provide a method of making such a semiconductor unit in which the last-mentioned contact wire, which in the semiconductor element described in the aforementioned copending application connects the second contact on the semiconductor body mounted on the socket plate with the second contact pin, can be eliminated, thereby effecting a saving in material.

The semiconductor unit, briefly stated, comprises a first semiconductor body having a pair of first major surfaces on opposite sides. A first contact is provided on and covers one of these first surfaces. A socket plate is conductively connected to the other of the first surfaces and has a first contact pin. A second semiconductor body has a pair of second major surfaces. A second contact is provided on and covers one of these second surfaces. A carrier is connected with the socket plate and second semiconductor body and located between the two. A second contact pin is provided on the second body at a side thereof facing away from the carrier, and a third contact pin is provided, both of them penetrating the socket plate in insulated relationship. A connecting wire has a straight first end portion conductively secured to the second contact pin, helically convoluted second end portion conductively secured to a third contact pin, and a center portion with respect to which each of the end portions extends at an angle. An additional contact pin is provided on the first semiconductor body at a side thereof facing away from the socket plate and this additional contact pin is in direct electrically conductive engagement with the carrier.

Thus, it is the carrier itself which provides the electrically conductive connection between the second contact of the semiconductor body mounted on the socket plate and the carrier. The separate connecting wire is thereby eliminated, as is the time previously required for securing it.

Advantageously the carrier has a section which is downwardly bent (towards the socket plate) and which tapers in the same direction, with the lower free end contacting and being soldered with the second contact of the second semiconductor body which is in turn soldered to the socket plate. In order to make it possible on assembly of the semiconductor unit to position the plane of the carrier in parallelism with the upper surface of the socket plate, the whole of the carrier is surrounded by a cylindrical bead coaxial with the hole and providing a guide and a means for soldering along the contact pin extending into the hole. In the interest of ready assembly and a certain amount of movability during soldering the inner diameter of the bead must be somewhat larger than the outer diameter of the contact pin to be received therein, and this to some extent negates the desired guidance effect and the parallel positioning desired to be obtained between the carrier plane and the surface of the socket plate. The reason for this is that the differential in inner and outer diameter of bead and associated contact pin makes possible skewing of their respective axes. To overcome this problem the portion of the carrier which carries the second semiconductor body is bent with reference to the general cross-sectional plane of the bead.

In a semiconductor unit in which both semiconductor bodies are provided each with an additional contact, with each of the additional contacts being electrically conductively connected with a fourth contact pin passing in insulated relationship through the socket plate, it is advantageous to establish this electrically conductive connection in form of a contact wire which extends from the additional contacts of the respective semiconductor bodies to the fourth contact pin. Advantageously this contact wire is provided with two vertically oriented end portions whose lower free ends are soldered to the respective third contacts of the semiconductor bodies, to at least substantially horizontally extending intermediate portions a helically convoluted portion which is slipped over and soldered to the fourth contact pin. Of course, this helically convoluted portion can also be secured in desired manner with the substantially horizontally extending portions, if desired, but construction of one piece is of course simpler. This contact wire can of course be replaced with two individual wires which are each connected with the fourth contact pin and with one of the third contacts of the respective semiconductor bodies.

The invention is concerned, as already pointed out, with a method of making the herein disclosed semiconductor unit. This method is intended to permit the proper orientation of the individual elements of the unit so as to make possible the solder connections between them in a single passage through a soldering oven, and to maintain this orientation during passage of the unit through the soldering oven.

According to the present invention this is achieved in that a holding device is provided composed of three templates which are formed with cut-outs for the individual components of at least one semiconductor unit according to the present invention. The templates can be stacked one above the other and guided in parallelism with one another by provision of suitable guide means. At least one of the socket plates to be used in assembling a semiconductor unit according to the present invention is provided with at least three contact pins formed on its underside which extend into bores provided for this purpose in a first one of the templates, whereupon the second template is put in place, which is provided with a cutout into which the semiconductor body which is to be soldered to the socket plate is placed. Solder is provided on at least one major surface of the semiconductor body and a solder layer can also be positioned between the semiconductor body and the socket plate. The carrier is then inserted into another cutout also provided in the second template and solder is provided in suitable manner, for instance in form of a solder layer or sheet. Then the third template is put in place and into a cutout provided therein the second semiconductor body to be soldered to the carrier is placed, at least one major surface of this second semiconductor body is covered with solder. At least one contact wire is inserted into an additional cutout provided in the third template and its helically convoluted end portion is simultaneously slipped over the associated contact pin and downwardly along the same until it extends skew with reference to the contact pin and thus clampingly engages the same. A ring of solder material is then placed around each of the contact pins which pass through the socket plate in insulated relationship, and thereupon the second and third templates are again removed and finally only the first template with the semiconductor unit assembled on it is passed into and through the soldering overn.

The clamping engagement of the helically convoluted portion of the contact wire or wires serves to press the semiconductor bodies or crystals onto their respective supports, so that even before the soldering all components of the entire semiconductor unit are fixed at their respective locations and cannot be dislodged by vibrations or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3*aa* is a side view of FIG. 3*a*;

FIG. 3*bb* is a side view of FIG. 3b;

FIG. 3*cc* is a side view of FIG. 3c;

FIG. 3*dd* is a side view of FIG. 3*d*;

DESCRIPTION OF THE PREFERRED EMBODIMENTS

Figure 1:
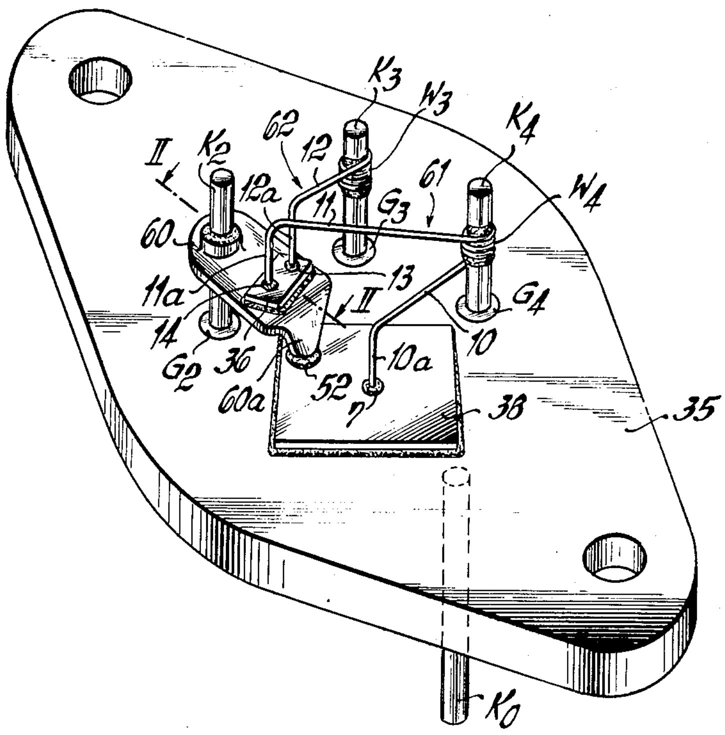
FIG. 1 is a perspective view illustrating a semiconductor unit to be assembled under the method according to the present invention, with the cover removed for clarity.
Figure 2:
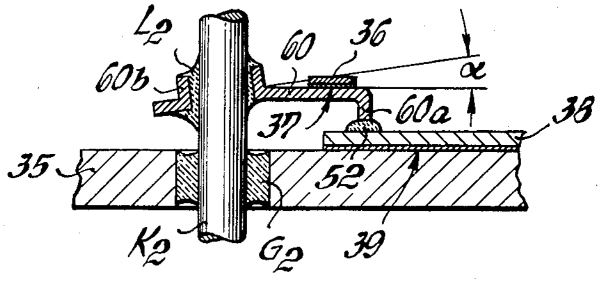
FIG. 2 is a fragmentary section taken on the line II—II of FIG. 1.
Figures 7, 8, 9:
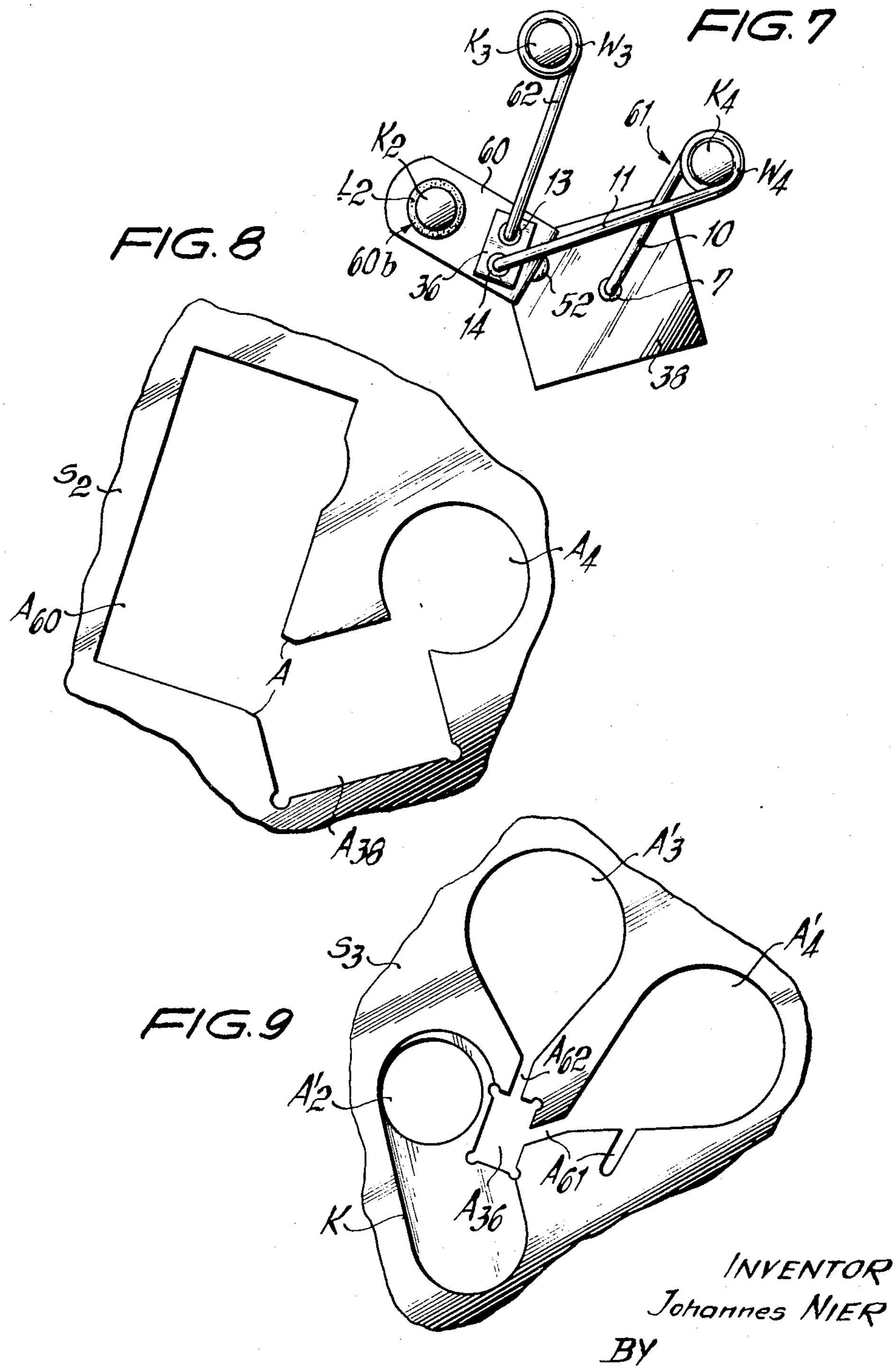
FIG. 7 is a plan view of the semiconductor unit of FIGS. 1 and 2 with the cover removed for clarity, with the socket plate and its first contact pin also eliminated for clarity.
FIG. 8 is a top-plan view of the cutouts in the second assembly template.
FIG. 9 is a top-plan view of the cut-outs in the third assembly template.

Discussing now the drawing in detail, and keeping in mind that the illustrated semiconductor units have been shown to facilitate an understanding of the novel method, it is firstly emphasized that the semiconductor unit illustrated in FIG. 1, 2 and 7 comprises two semiconductor bodies 38 and 36 of generally the shape of small plates. Of these, the semiconductor body 38 is provided on its underside with a first contact 39 which is illustrated in FIG. 2 and covers the entire underside of the body 38. This contact is solder connected with a socket plate 35 which constitutes a part of the housing of the unit and at the same time constitutes an electrode contact for the semiconductor body 38. At its underside the socket plate 35 carries a first contact pin $A_O$ which serves for current supply for the contact 39 of the body 38.

The underside of the semiconductor body 36 is also provided with a first contact which in turn covers the entire underside of the body 36. This contact 37 of the body 36 is soldered to a carrier 60 arranged above the socket plate 35 and which is provided with a hole in which a second contact pin $K_2$ is received.

To permit proper adjustment of the semiconductor body 36 during the assembly of the unit, it is desirable that on assembly the plane of the carrier, that is the section of the carrier 60 which supports the semiconductor body 36, be capable of adjustment in parallelism with the upper surface of the socket plate 35. For this purpose the whole of the carrier 60 is provided with a cylindrical bead 60b which is coaxial with the hole 60. Solder $L_2$ serves to solder connect the carrier 60 via the bead 60*b* with the second contact pin $K_2$.

In the interests of ready assembly and movability during soldering of the semiconductor unit the inner diameter of the bead 60b should be somewhat larger than the outer diameter of the contact pin $K_2$, and specifically be 0.05 mm larger than the outer diameter of the contact pin $K_2$ which is 1 millimeter, and this results in a loss of the guidance desired by the aid of the bead 60*b* along the contact pin $K_2$ during assembly and the parallel positioning of the carrier plane and surface of the socket plate 35; the reason for this is that the axis of the contact pin $K_2$ and the bead 60*b* move to skew position when the parallelism adjustment is carried out. To overcome this problem the portion of the carrier 60 which supports the semiconductor body 36 is bent at an angle of 7° (see FIG. 2) with reference to the cross-sectional plane of the bead 60b if the axial length of the bead 60*b* is 1 millimeter, given the other aforementioned dimensions for the diameter of the bead and of the pin $K_2$. The latter, incidentally, serves to supply electrical energy to the contact 37 of the semiconductor body 36. It passes through the socket plate 35 in insulated relationship by means of a glass inclusion $G_2$.

The drawing shows that in addition to its first contact 37 located at the underside, the semiconductor body 36 has a second contact 36 located at its upper side and connected with a third contact pin $K_3$ by means of the contact wire 36. This contact pin $K_3$ also passes in insulated relationship through the socket plate 35 by means of a glass inclusion $G_3$.

Figures 3A, 3B, 3C, 3D:
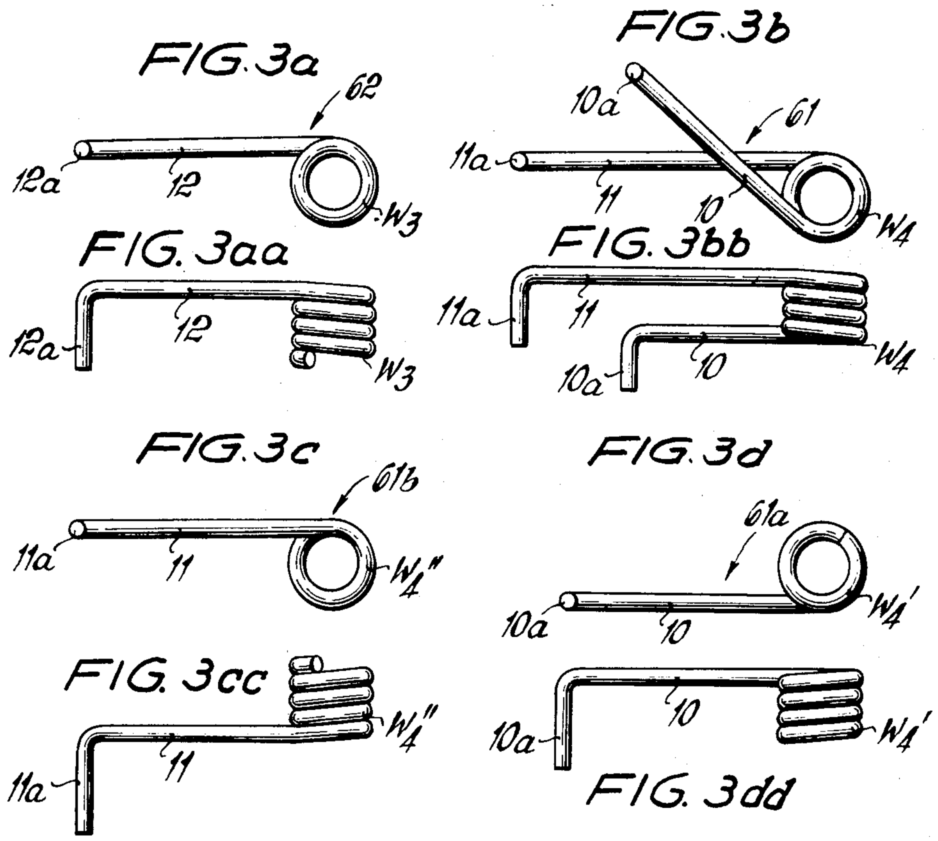
FIG. 3*a* is a bottom-plan view of one contact wire for use in the embodiment of FIG. 1.
FIG. 3*b* is a bottom view of a further contact wire for use in the embodiment of FIG. 1.
FIG. 3*c* is a bottom view of an additional contact wire for use in the embodiment of FIG. 1.
FIG. 3*d* is a bottom view of yet an additional contact wire for use in the embodiment of FIG. 1.

The contact wire 62 (see FIGS. 3a and 3aa) comprises a straight at least substantially horizontal center section 12, a first end section 12a which is also straight but angled with reference to the center section 12 and extending at least substantially vertical, and an additional end section $W_3$ which also extends at an angle to the center section 12 but is helically convoluted. The axis of the helically convoluted end section $W_3$ extends vertical or at near vertical. The lower end of the section 12*a* is soldered to the contact 13 of the semiconductor body 36 whereas the end section $W_3$ is pushed over the contact pin $K_3$ and soldered to the same.

The second contact 52 of the semiconductor body 38 is provided at the upper side thereof and electrically conductively connected to the carrier 60, and the drawing clearly shows that this electrically conductive connection is effected by the carrier 60 itself which for this purpose comprises a downwardly bent and downwardly tapering section 60*a* whose lower end is soldered with the contact 52, thereby avoiding the necessity for providing a separate contact wire.

A third contact 7 is provided on the semiconductor body 38 arranged adjacent the second contact 52 at the upper side of the body 38. Similarly, the semiconductor body 36 has a third contact 14 provided at its upper side. Each of the contacts 7 and 14 is electrically conductively connected with a common fourth contact pin $K_4$ which passes in insulated relationship through the socket plate 35 by means of a further glass inclusiong $G_4$. The conductive connection is established by means of a common contact wire 61 (see FIGS. *3b* and *3bb*) which is provided with two vertically extending end sections 10*a*, 11*a* whose lower free ends are soldered with the contacts 7 and 14, respectively. There are further provided two at least substantially horizontal sections 10 and 11 and located between these a helically convoluted center section $W_4$ which is pushed over the fourth contact pin $K_4$ and soldered to the same.

It will be appreciated that the illustrations in FIGS. *3a–3d* are all on a substantially enlarged scale for purposes of clarity. Keeping this in mind it is emphasized that in place of the contact wire 61 of FIGS. *3b* and *3bb*, it is also possible to use individual contact wires 61*a* and 61*b* as illustrated in FIGS. *3d*, *3dd* and *3c*, *3cc*. The contact wire 61*a* is intended for establishing contact with the contact 7 and is, as shown in FIGS. *3d*, *3dd* substantially constructed in the same manner as the contact wire 62 of FIGS. *3a*, *3aa*. In the contact wires 61*a*, 62 the helical convolution $W_4$ or $W_3$ —as seen from the center section 10 or 12, respectively— extends in the same direction as the opposite straight end section 10*a* or 12*a*, respectively. In the contact wire 61*b*, however, which is intended for the contact 14 and illustrated in FIG. *3c*, *3cc*, the convolution $W_4''$ and the end section 11*a* are so arranged as to obtain a good pretensioning force, in that the two end sections $W_4''$ and 11*a* extend mutually opposite directions as seen with reference to the center section 11.

Figure 4:
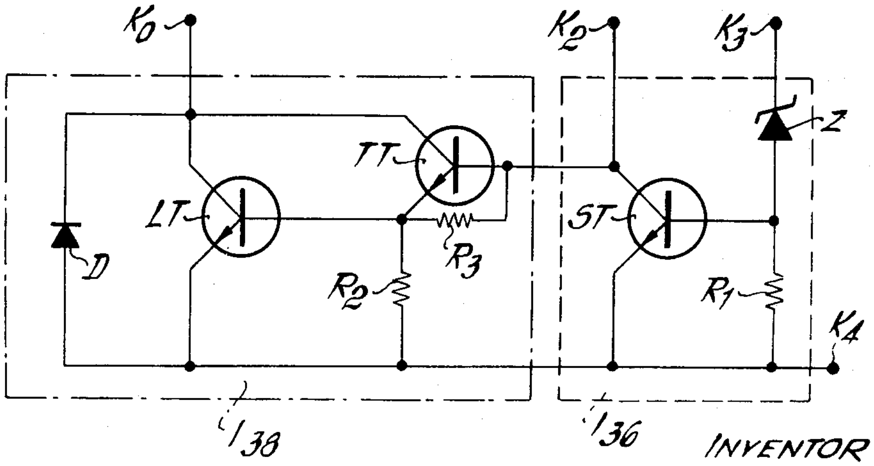
FIG. 4 is the electrical circuit diagram of a hybrid semiconductor unit in which both semiconductor bodies are monolithic.

It will be appreciated that the two semiconductor bodies 36 and 38 may be discrete elements of which each for instance comprises only a single transistor. However, they may also be in the form of monolithic integrated circuits $I_{36}$ and $I_{38}$ which may for instance be produced according to the planar technology. FIG. 4 illustrates a possible exemplary embodiment of such a construction, wherein both the semiconductor body 36 and the semiconductor 38 comprise an integrated circuit. In FIG. 4 the integrated individual elements provided in the semiconductor body 36 are shown in broken lines, and as provided in the semiconductor body 38 is shown in dot-dash lines. In this embodiment the semiconductor body 36 is provided with a monolithic integrated circuit composed of a control transistor ST a resistor $R_1$ in parallelism with the emitter-base circuit of the control transistor and a Zener diode Z whose anode is connected with the basis of the control transistor ST. The first contact 37 of the semiconductor body 36, which is solder-connected with the carrier 60, constitutes the collector contact of the control transistor ST, whereas the second contact 13 constitutes the cathode contact of the Zener diode C and the third contact 14 constitutes the emitter contact of the control transistor ST.

In the embodiment illustrated in FIG. 4 the semiconductor body 38 contains a Darlington transistor circuit. This is composed of a driver transistor TT, a power transistor LT whose collector is connected with the collector of the driver transistor and the basis of which is connected with the emitter of the driver transistor, and there is further provided a resistor $R_3$ arranged in parallelism with the emitter-basis circuit of the driver circuit, a resistor $R_2$ arranged in parallelism with the emitter-basis circuit of the power transistor, and a diode D in parallelism with the emitter-collector circuit of the power transistor; the anode of the diode D is connected with the emitter of the power transistor.

The first contact 39 of the semiconductor body 38, which is solder-connected with the solder plate 35, constitutes the joint collector connection for the two transistors TT and LT, whereas the second contact 52 constitutes the basis-connection of the driver transistor TT and the third contact 7 constitutes the emitter connection of the power transistor LT. The two integrated circuits $I_{36}$ and $I_{38}$ can be used as voltage regulators in a manner analogous to the manner described in the aforementioned copending application.

Coming now to FIGS. 5, 6, 8 and 9 it will be seen that these illustrate a holding device for assembly of the novel semiconductor unit, i.e., for carrying out the method. It is composed essentially of three templates $S_1$, $S_2$ and $S_3$ provided with cutouts for the individual components of the unit. They are stacked in superimposed relationship and guided in paralelism by means of the guide pins 16 provided in the first template $S_1$. In the illustrated embodiment of the arrangement is so constructed that four semiconductor units can be assembled simultaneously and in side-by-side relationship, and can then be soldered —that is their individual components can be solder-connected— in a single passage through a soldering oven with the templates $S_2$ and $S_3$ being removed immediately before entry of the template $S_1$ and its associated semiconductor units into the soldering oven.

Figures 5, 6:
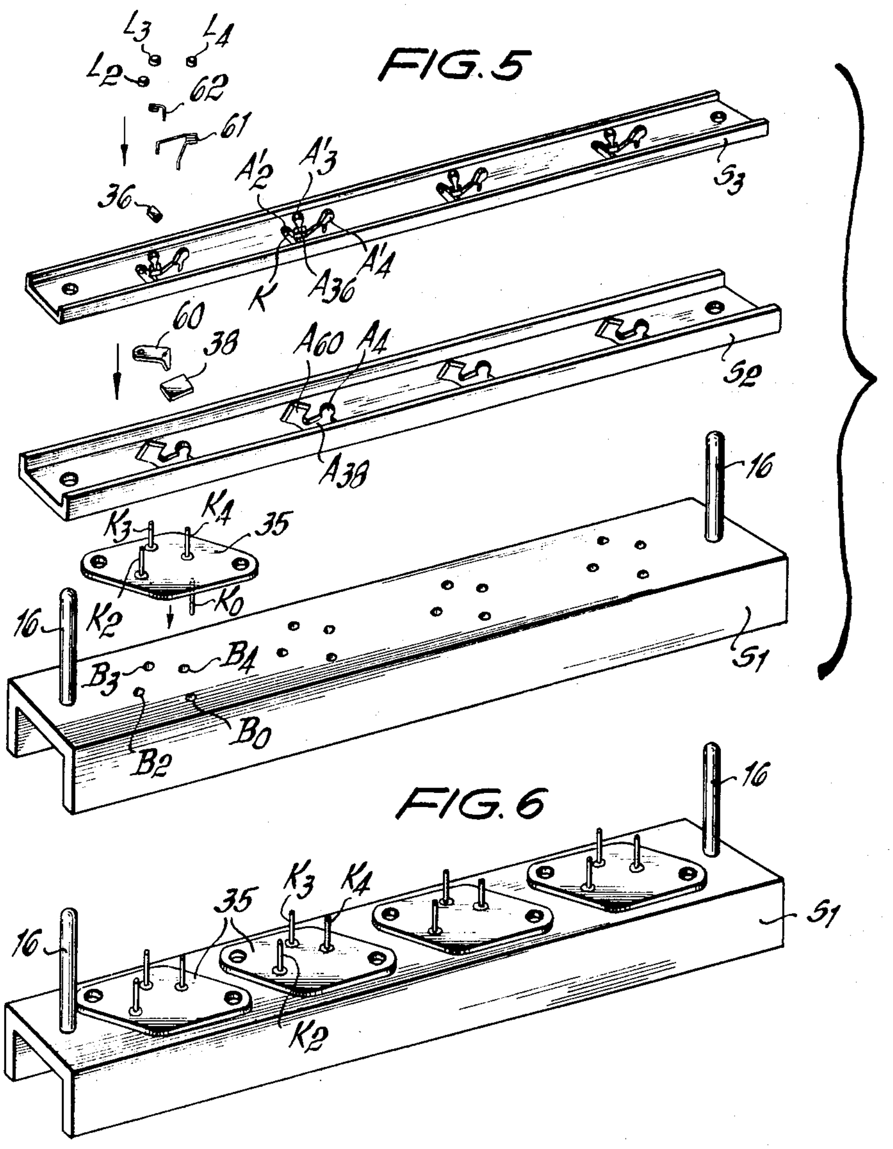
FIG. 5 is a perspective exploded view illustrating the assembly templates used in carrying out the method according to the present invention, with the respectively associated components of the semiconductor unit.
FIG. 6 is a perspective view of the first of the three templates with four pre-applicated socket plates carried thereby.

For the assembly purposes the socket plate 35 with its contact pins $K_0$, $K_2$, $K_3$ and $K_4$ must already be prefabricated. For this purpose the contact pins $K_2$, $K_3$ and $K_4$ are inserted into bores of the socket plate 35 and are retained therein by fused-glass insulating material, whereby the glass inclusions $G_2$, $G_3$ and $G_4$ result so that the pins $K_2$, $K_3$ and $K_4$ are insulated from the socket plate 35. Thereupon the pin $K_4$ is butt-welded on the underside of the socket plate 35. It is emphasized, however, that in lieu of this arrangement the pin $K_4$ can also be hard-welded to the underside of the socket plate 35 at the same time as the glass inclusions are provided. Once this is carried out, all metal surfaces of the prefabricated socket 35 are coated with a metallic layer wettable with soft solder, preferably a layer of nickel. FIG. 5 shows that when semiconductor units are to be assembled by means of the templates $S_1$, $S_2$ and $S_3$, four of the prefabricated socket plates 35 are inserted with their respective contact pins $K_0$, $K_2$, $K_3$ and $K_4$ into bores $B_0$, $B_2$, $B_3$ and $B_4$ provided for this purpose in the first template $S_1$. This is also evident from FIG. 6 and it is pointed out that thereupon the second template $S_2$ is so applied that it overlies the upper sides of the socket plates 35. The contact pins $K_2$, $K_3$ and $K_4$ projecting at these upper sides pass through correspondingly configurated cutouts A60, A4 provided in the second template $S_2$, as shown in FIG. 8. The cutout $A_{60}$ serves at the same time for receiving the carrier 60. A further cutout $A_{38}$ is provided in the second template $S_2$, as shown in FIGS. 5 and 8; into this there is inserted with the aid of a suitable tool, for instance a suction tool, a semiconductor body 38 which is to be soldered onto the socket plate 35. The semiconductor body 38 is covered or coated with solder at least at its upper contacts 52 and 7. The edges of the cutout $A_{38}$ are widened for protecting the corners of the semiconductor body. It is possible if desired to cover or coat the underside of the semiconductor body 38 also with solder, but in place of this or in addition thereto it is also possible to insert a plate of solder into the cutout $A_{38}$ before the semiconductor body 38 is introduced.

Once this has taken place the carrier 60 is introduced into the cutout $A_{60}$ of template $S_2$ and its position is determined in predetermined orientation by means of the bead 60*b* which is pushed during the insertion over the contact pin $K_2$, as well as by the two contact portions A in the cutout $A_{60}$ as evident from FIG. 8. As this takes place, the downwardly directed section 60*a* of the carrier 60 contacts the precoated contact 52 of the semiconductor body 38. Now the third template $S_3$ is put in place as shown in FIG. 5. As illustrated in FIG. 9 the third template $S_3$ has cutouts $A'_2$, $A'_3$ and $A'_4$ for passage of the contact pins $K_2$, $K_3$ and $K_4$. A suitable tool, such as a suction tool, is again used for inserting the semiconductor body 36 into a further cutout $A_{36}$ of the third template $S_3$, as shown in FIGS. 5 and 9. The template $S_3$ is depressed along the contour K for facilitating this insertion and to such an extent that the bottom of this depression is approximately on a level with the surface of the semiconductor body 36. As before, the corners of the cut-out $A_{36}$ are widened for protection of the edges of the semiconductor crystal.

At its upper contacts 13 and 14 the semiconductor body 36 is already coated with solder. It can also be coated at its underside with solder but in place of this, or in addition thereto, the carrier 60 may be provided at the portion at which the semiconductor body 36 is to be secured thereto, with a solder precoating. Thereupon, the contact wires 61 and 62 are inserted into cutouts $A_{61}$, $A_{62}$ provided for this purpose in the template $S_3$ and located above the recesses or cutouts $A_{38}$ and $A_{60}$ of the second template $S_2$. During such insertion the helically convoluted sections $W_4$ and $W_3$ of the contact wires 61 and 62 are pushed over the respectively associated contact pins $K_4$ and $K_3$. Because of the template guidance the end points of all current supply contacts automatically become associated with the associated contacts of the semiconductor bodies 36 and 38.

When the assembly has progressed to this point, the helically convoluted sections $W_3$ and $W_4$ are downwardly depressed along their respectively associated contact pins $K_3$ and $K_4$ —simultaneously and with the aid of a gauge— until they extend skew to these pins and become clamped. This displacement is only by a small distance and by proper dimensioning of the lengths as well as of the straight end sections 10*a*, 11*a* and 12*a* as well as of the helices $W_3$ and $W_4$, the use of a template may be omitted if the helices $W_3$ and $W_4$ are displaced downwardly along their associated contact pins $W_3$ and $W_4$ until they abut against the respectively associated glass inclusions $G_3$ and $G_4$; this results automatically in an always reproducible pretensioning force.

At this point annuli $L_2$, $L_3$ and $L_4$ are slipped over the contact pins $K_2$, $K_3$ and $K_4$, respectively. The templates $S_2$ and $S_3$ are now lifted off and thereupon the template $S_4$ carrying the four assembled semiconductor units, is introduced into the soldering oven. Conventionally, such soldering ovens are of the pass-through type, and when the now solder-connected and assembled units with the template $S_1$ re-emerge from the soldering oven, the units are ejected from the template $S_1$ by means of a non-illustrated ejector of known construction.

It is pointed out that the shifting of sections $W_3$ and $W_4$ overcomes the height differential between the contacts 7 and 14 which otherwise could make simultaneous abutment of the lower ends of the common connecting wire 61 impossible. On the other hand, this displacement or shifting assures that the now pretensioned contact wires 61 and 62 assures that the entire unit composed of the components 61, 62, 36, 60 and 38 will properly descend during the soldering process so that these portions will always remain in proper contact with one another at the contact points where they are to be solder-connected.

It will be appreciated that it is necessary for the contact wires 61 and 62 to consist of a material which not only has good electrical conductivity, but which is also readily solderable and which must have necessary spring characteristics in the interest of obtaining the desired pretension. Furthermore, these features must be retained during heating to soldering temperature, that is the recrystallizing temperature of of the cold-deformed material of which the wires 61 and 62 consist, must be above the soldering temperature so that the elasticity modulus of the wires remains unchanged during the soldering process. In accordance with the invention it has been found that silver-copper alloys with low percentages by weight of copper, for instance AG 97 Cu 3, as well as cold-deformed nickel wire are excellent for this purpose. Furthermore, and also in accordance with the invention, all solder material provided at the contacts of the semiconductor bodies 36 and 38 consist of a soft solder on lead basis, preferably of Pb 96 Sn 4. The solder annuli $L_2$, $L_3$ $L_4$ may consist of Pb 92.5 Sn 5, Ag, of Sn 96 Ag 4 Bi 0.5 or of an alloy of Pb–Sn whose tin content is between 6 and 10 percent by weight. Soldering of the hybrid semiconductor unit is carried out advantageously, but not necessarily, in a pass-through soldering oven filled with $N_2$ 90 $H_2$ 10 at a temperature of the hybrid of approximately 375° C.

In FIGS. *3d, 3dd* and *3c, 3cc* individual contact wires 61*a*, 61*b* have been shown which may be used, as desired, in place of the single common contact wire 61 for connecting the contacts 7 and 14 with the contact pin $K_4$. In this case the insertion of these individual contact wires 61*a*, 61*b* into the cutout $A_{61}$ of the third template $S_3$ is carried out in that first the contact wire 61*a* is inserted and its downwardly directed helix section $W'_4$ is pushed over the pin $K_4$. Thereupon a solder annulus is pushed over the pin $K_4$ and the second contact wire 61*b* is inserted into the cutout and pushed with its upwardly directed helical section $W''_4$ over the contact pin $K_4$. After the two contact wires 61*a*, 61*b* are moved to effect the desired pretensioning, a second solder annulus $L_4$ is placed over the contact pin $K_4$ before the template $S_1$ with its assembled but not yet solder-connected semiconductor units is ultimately introduced into the soldering oven.

It will be appreciated that with the construction according to the present invention the assembly of semiconductor units according to the present invention is still simpler than that set forth in the aforementioned copending application, that it is less time-consuming and that material can be saved with a concomitant reduction in the manufacturing expense. It must be kept in mind that units of the type here in question are mass-produced in exceedingly large quantities so that savings of even fractions of a cent per unit are desirable.

It will be understood that each of the elements described above, or two or more together, may also find a useful application in other types of construction differing from the types described above.

While the invention has been illustrated and described as embodied in a method of making a semiconductor unit, it is not intended to be limited to the details shown, since various modificatins and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, if such adaptations should and are intended to be comprehended within the meaning and range of equivalence of the following claims.

What is claimed as new and desired to be protected by Letters Patent is set forth in the appended

1. A method of assembling a semiconductor unit, comprising the steps of providing a holding device composed of a set of three assembly templates stackable and vertically guidable with reference to one another and provided with recesses for respective components of at least one semiconductor unit; providing a first and a second semiconductor body, a socket plate, a plurality of contacts, contact pins and a connecting wire; connecting a pair of contact pins in insulated relationship with said socket plate; inserting said contact pins of said socket plate into corresponding apertures of a first template of said set; placing a second template onto said first template; disposing in a recess of said second template of said set said first semiconductor body, and in an other recess said carrier; placing a third template onto said second template; disposing in a recess of said third template said second semiconductor body, and in at least one other recess said connecting wire while simultaneously pushing a helically convoluted second end portion thereof onto one of said pair of contact pins and along the same until it is skew with reference thereto and clampingly engages said one contact pin and is under pretension; slipping an annulus of solder material onto said pair and an additional contact pin; removing said second and third templates from said first template; and placing said first template and the components carried thereby into a soldering oven for a requisite period of time to thereby effect soldering of said components to one another.

2. A method as defined in claim 1, said connecting wire having a first and a helically convoluted second end portion, and wherein the length of said first and helically convoluted second end portions are so related that the desired pretension of said connecting zone is obtained when said second end portion is pushed along said one contact pin to the maximum extent possible.

3. A method as defined in claim 1, said soldering oven being of the pass-through type and being filled with an atmosphere of $N_2$ 90 $H_2$ 10, and said unit being heated therein to 375° C.

4. A method as defined in claim 2, further comprising the step of placing an annulus of solder material onto said one contact pin atop said second end portion of said connecting wire; and placing an additional connecting wire into said other recess of said third template with a helically convoluted additional second end portion of said additional connecting wire surrounding said one contact pin but facing in opposite axial direction from said second end portion of the first-mentioned connecting wire, and pushing said additional second end portion along said one contact pin towards said annulus until said additional second end portion is skew with reference to said one contact pin and said additional connecting wire is pretensioned.

5. A method as defined in claim 1, wherein the step of placing said first template and components into a soldering oven comprises passing them through a soldering oven of the pass-through type.

6. A method as defined in claim 1, wherein the step of placing said first template and components into a soldering oven comprises heating them in said oven to a temperature of substantially 375° C.

7. A method as defined in claim 1, wherein said steps are carried out consecutively.

* * * * *